United States Patent Office 3,193,562
Patented July 6, 1965

3,193,562
SYNTHESIS OF HALOPYRUVIC ACIDS AND INTERMEDIATES THEREFOR
Angelo John Speziale, Kirkwood, and Lowell R. Smith, St. Louis, Mo., assignors to Monsanto Company, a corporation of Delaware
No Drawing. Filed Oct. 11, 1962, Ser. No. 229,993
9 Claims. (Cl. 260—347.7)

This invention relates to the synthesis of halopyruvic acids and to new and useful intermediates obtained thereby.

In accordance with this invention it has been found that halopyruvic acids of the formula $$X-CH_2-\underset{\underset{O}{\|}}{C}-\underset{\underset{O}{\|}}{C}-OH$$

wherein X is halogen of atomic number less than 36 (i.e. bromine, chlorine or fluorine) can be prepared by the acid hydrolysis of the 2,2-dichloro-3(2H)-furanone reaction product of oxalyl chloride and an α-haloacetamide of the formula $$X-CH_2-\underset{\underset{O}{\|}}{C}-N\diagdown$$

wherein X has the aforedescribed significance and wherein —N< is the residue of a secondary amine.

The 2,2-dichloro-3(2H)-furanone intermediates can be represented by the structure $$\begin{matrix} O=C\text{------}C-X \\ | \quad\quad \| \\ Cl_2-C \quad C-N\diagdown \\ \diagdown_O\diagup \end{matrix}$$

wherein X has the aforedescribed significance and wherein —N< is the residue of a secondary amine, e.g. a (1) Saturated single ring heterocyclic amine residue of the formula $$\underset{\underset{\smile}{A}}{\frown}N-$$

wherein A is —CH$_2$CH$_2$OCH$_2$CH$_2$—,

—CH$_2$CH$_2$SCH$_2$CH$_2$— or alkylene of from 4 to 10 carbon atoms and having from 4 to 6 carbon atoms in a continuous chain between the valence bonds, or a (2) Secondary amine residue of the formula $$-N\diagup^M_{\diagdown G}$$

wherein M and G are like or unlike hydrocarbyl radicals having 1 to 10 carbon atoms such as the various aryl, alkaryl, aralkyl or alkyl radicals or said hydrocarbyl radicals having at least one substituent such as lower alkoxy, chlorine or bromine. As illustrative of such radicals are methyl, ethyl, propyl, butyl, amyl, octyl, decyl, benzyl, phenethyl, phenbutyl, phenyl, naphthyl, tolyl, xylyl, ethylphenyl, butylphenyl, and the various isomeric forms thereof, methoxyethyl, ethoxyethyl, propoxyethyl, methoxyphenyl, ethoxyphenyl, diethoxyphenol, chloroethyl, chlorobutyl, dichloropropyl, trichlorobutyl, ar-chlorobenzyl, chlorophenyl, ar-chlorotolyl, chloronaphthyl, dichlorophenyl, trichlorophenyl, bromoethyl, bromoamyl, bromophenyl, dibromophenyl, tribromophenyl, bromodichlorophenyl, ar-chloroanisyl, ar-chlorophenethyl, and the various isomeric forms thereof. In general with respect to (2) it is preferred that M be an alkyl radical having 1 to 10 carbon atoms and that G be an alkyl radical having from 1 to 10 carbon atoms or an aromatic hydrocarbon radical of the benzene series having 6 to 10 carbon atoms.

The aforedescribed 2,2-dichloro-3(2H)-furanones are prepared by reacting oxalyl chloride with an α-haloacetamide of the aforedescribed formula. As illustrative of operable α-haloacetamide reactants are N-(chloroacetyl)morpholine,
N-(bromoacetyl) morpholine,
N-(fluoroacetyl) morpholine,
N-(chloroacetyl) pyrrolidine,
N-(chloroacetyl) piperidine,
N-(bromoacetyl) piperidine,
N-(chloroacetyl) alphapipecoline,
N-(chloroacetyl) betapipecoline,
N-(bromoacetyl) gammapipecoline,
N-(chloroacetyl) alpha,gammalutidine,
N-(chloroacetyl) 2,4-dimethylpyrrolidine,
N-(bromoacetyl) 3-ethyl-4-methylpiperidine,
N-(fluoroacetyl) 4-isobutylpiperidine,
N-(chloroacetyl) 3-butyl-2-methylpiperidine,
N-(chloroacetyl) hexamethyleneimine,
N-(bromoacetyl) hexamethyleneimine,
N,N-dimethyl-alphachloroacetamide,
N,N-dimethyl alphabromoacetamide,
N,N-dimethyl alphafluoroacetamide,
N,N-diethyl alphachloroacetamide,
N-ethyl-N-methyl alphachloroacetamide,
N,N-di-n-butyl alphachloroacetamide,
N,N-diisoamyl alphachloroacetamide,
N,N-di-n-decyl alphachloroacetamide,
N-methyl-N-phenyl alphachloroacetamide,
N-methyl-N-benzyl alphabromoacetamide,
N-ethyl-N-p-tolyl alphachloroacetamide,
N,N-dibenzyl alphachloroacetamide,
N,N-di-β-phenethyl alphachloroacetamide,
N,N-diphenyl alphachloroacetamide,
N,N-dinaphthyl alphachloroacetamide,
N-ethyl-N-naphthyl alphachloroacetamide,
N,N-di(ethoxyethyl) alphachloroacetamide,
N,N-di(2-chloroethyl) alphachloroacetamide,
N,N-di(4-chlorophenyl) alphachloroacetamide,
N,N-di(2,4-dichlorophenyl) alphachloroacetamide,
N-methyl-N-4-chlorophenyl alphachloroacetamide,
N-methyl-N-3-chloro-4-anisyl alphachloroacetamide,
N-ethoxyethyl-N-2-chloro-4-bromophenyl alphachloroacetamide, etc.

While the oxalyl chloride and the α-halocetamide reactant react in a molar ratio of 2:1 an excess of either reactant can be employed where and when desired. While a wide range of reaction temperatures can be employed provided the reaction system is fluid (i.e. maintained at a temperature above the freezing point of the system up to and including the system's boiling point) reaction temperatures in the range of 0° C. to 100° C. are preferred. Where and when desired the reaction can be conducted in the presence of an inert organic liquid or solvent such as methylene chloride, 1,2-dichloroethane, chloroform, carbon tetrachloride, acetone, hexane, octane, etc.

The aforedescribed halopyruvic acids are obtained by hydrolyzing the aforedescribed 2,2-dichloro-3(2H)-furanones in the presence of dilute mineral acid such as hydrochloric acid, hydrobromic acid, sulfuric acid, etc. The amount of water present to conduct the hydrolysis will be at least three moles per mole of the 2,2-dichloro-3(2H)-furanone, however to increase the rate of hydrolysis amounts up to 25 moles of water per mole of 2,2-dichloro-3(2H)-furanone can be employed. The amount of mineral acid in the anhydrous form can vary widely but usually will be in the weight range of 5 parts to 20 parts per 100 parts of water. While a wide range of reaction temperatures can be employed provided the reaction system is fluid (i.e. maintained at a temperature above the freezing point of the system up to and including the system's boiling point) reaction temperatures in the range of 5° C. to 100° C. are preferred. Where and when desired an inert organic liquid or solvent can be used, e.g. dichloroethane, chloroform, carbon tetrachloride, hexane, octane, acetone, etc. Low molecular weight alcohols such as methanol can be used provided water is not permitted to be removed from the reaction mass. Due to the hygroscopic nature of these halopyruvic acids it is preferred to recover them in the form of alkyl esters thereof. Esterifying alcohols of the formula ROH wherein R is a lower alkyl radical, that is methyl, ethyl, propyl, butyl, amyl, and various isomeric forms thereof containing up to 5 carbon atoms are particularly useful.

The overall mechanics involved in the synthesis of halopyruvic acids can be represented as follows:

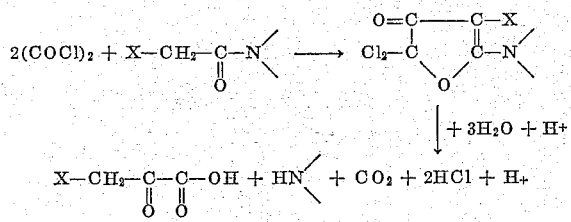

As illustrative of the instant invention is the following:

Example I

To a suitable reaction equipped wtih an agitator, thermometer and reflux condenser is charged 10.0 parts by weight (substantially 0.067 mole) of N,N-diethyl alphachloroacetamide and approximately 96 parts by weight of methylene chloride. While maintaining the so-charged mass at about 0° C. and with agitation 17.0 parts by weight (substantially 0.135 mole) of oxalyl chloride is added dropwise. Upon completion of the oxalyl chloride addition the reaction mass is agitated at room temperature for about two hours. The reaction mass is then evaporated under reduced pressure. The solid residue, about 19.2 parts by weight, is then recrystallized from a mixture of hexane, methylene chloride and charcoal to give 17 parts of 5-diethylamino-2,2,4-trichloro-3(2H)-furanone, M.P. 73–74.5° C.

*Analysis.*—Theoretical: 5.41% N, 41.14% Cl. Found 5.39% N, 41.17% Cl.

Example IA

To a suitable reaction vessel equipped with an agitator is charged 18.0 parts by weight of 5-diethylamino-2,2,4-trichloro-3(2H)-furanone, approximately 40 parts by weight of methanol and approximately 50 parts by weight of 10% by weight hydrochloric acid. The so-charged mass is heated to the reflux temperature (about 80° C.) and refluxed for 24 hours. The resultant mass is distilled under diminished pressure to remove the methanol. The residue is then refluxed for about one hour and then allowed to cool. The so-cooled mass is then extracted with diethyl ether and the ether extract dried over anhydrous magnesium sulfate. The so-dried solution is then evaporated to dryness yielding chloropyruvic acid.

Example IB

The chloropyruvic acid obtained in Example IA is admixed with 15 parts by weight of thionyl chloride and the solution warmed at 55° C. for one hour. The solution is then distilled under diminished pressure to remove unreacted thionyl chloride. The residue is dissolved in 40 parts by weight of methanol and the solution then refluxed for 30 minutes. The excess methanol is removed by vacuum distillation. The residue is then distilled in vacuo and the cut taken at 65–75° C. at 4–10 mm. is methyl chloropyruvate, a liquid at room temperature, which is identical with an authentic sample thereof.

Example II

Employing the procedure of Example IB but esterifying the chloropyruvic acid with isoamyl alcohol there is obtained isoamyl chloropyruvate.

Example III

To a suitable reaction vessel equipped with an agitator, thermometer and reflux condenser is charged 12.1 parts by weight of N,N-dimethyl alphachloroacetamide and approximately 69 parts by weight of methylene chloride. While maintaining the so-charged mass at about 0° C. and with agitation 25.4 parts by weight of oxalyl chloride is added dropwise. Upon completion of the chloride addition the reaction mass is warmed to room temperature and then agitated for 24 hours. Thereafter the mass is evaporated under diminished pressure and the solid residue recrystallized first from an acetone-water mixture and then from a hexane-methylene chloride-charcoal mixture to give 20.1 parts by weight of 5-dimethylamino-2,2,4-trichloro-3(2H)-furanone, M.P. 114–116° C.

Example IV

Employing the procedure of Example III but replacing N,N-dimethyl alphachloroacetamide with an equimolecular amount of N-(bromoacetyl) hexamethyleneimine there is obtained 5-hexamethyleneimino-2,2-dichloro-4-bromo-3(2H)-furanone. This furanone on hydrolyzing in accordance with the procedure of Example IA yields bromopyruvic acid.

Example V

To a suitable reaction vessel equipped with an agitator, reflux condenser and thermometer is charged 8 parts by weight N-methyl-N-phenyl alphachloroacetamide, approximately 140 parts by weight of methylene chloride, and 11.1 parts by weight of oxalyl chloride. The so-charged mass is heated to reflux (about 35–40° C.) and refluxed for 3 hours. The reaction mass is then evaporated under reduced pressure and the residue recrystallized from a hexane-methylene chloride mixture to give 11.7 parts by weight of 5 - (N-methyl-N-phenylamino) - 2,2,4 - trichloro-3(2H)-furanone, M.P. 149–150° C.

Example VI

Employing the procedure of Example V but replacing N-methyl-N-phenyl alphachloroacetamide with an equimolecular amount of N-ethyl-N-4-chlorophenyl alphachloroacetamide there is obtained 5-(N-ethyl-N-4-chlorophenylamino)-2,2,4-trichloro-3(2H)-furanone.

Example VII

Employing the procedure of Example III but replacing N,N dimethyl alphachloroacetamide with an equimolecular amount of N,N-di(2-ethoxyethyl) alphachloroacetamide there is obtained 5-di(2-ethoxyethyl)amino-2,2,4-trichloro-3(2H)-furanone. This furanone on hydrolyzing in accordance with the procedure of Example IA yields chloropyruvic acid.

Example VIII

Employing the procedure of Example III but replacing N,N-dimethyl alphachloroacetamide with an equimolecular amount of N-methyl-N-ethyl alphafluoroacetamide there is obtained 5 - (N-methyl-N-ethylamino) - 2,2 - dichloro-4-fluoro-3(2H)-furanone. This furanone on hydrolyzing in accordance with the procedure of Example IA yields fluoropyruvic acid.

Example IX

To a suitable reaction vessel equipped with an agitator, reflux condenser and thermometer is charged 12.25 parts by weight of N,N-diphenyl alphachloroacetamide, 13.0 parts by weight of oxalyl chloride and approximately 105 parts by weight of chloroform and the so-charged mass refluxed (about 60° C.) for 12 hours. The resultant mass is then evaporated under reduced pressure and the residue dissolved in acetone to which solution water is added and the mass cooled to about 10° C. The precipitated yellow solid is filtered off and recrystallized first from an acetone-water mixture and then from a hexane-methylene chloride-charcoal mixture to give 14.9 parts by weight of 5 - diphenylamino - 2,2,4 - trichloro - 3(2H)-furanone, M.P. 166–167° C.

*Example X*

Employing the procedure of Example IX but replacing N,N-diphenyl alphachloroacetamide with an equimolecular amount of N-(chloroacetyl) morpholine there is obtained 5-(4-morpholino)-2,2,4-trichloro-3(2H)-furanone. This furanone upon hydrolyzing in accordance with Example IA yields chloropyruvic acid.

*Example XI*

Employing the procedure of Example IX but replacing N,N-diphenyl alphachloroacetamide with an equimolecular amount of N-isopropyl-N-3-chlorophenyl alphachloroacetamide there is obtained 5-(N-isopropyl-N-3-chlorophenylamino) - 2,2,4 - trichloro-3(2H)-furanone. This furanone upon hydrolyzing in accordance with the procedure of Example IA yields chloropyruvic acid.

In addition to being useful intermediates in the synthesis of halopyruvic acids the 2,2-dichloro-3(2H)-furanones described hereinbefore are useful as preemergent herbicices against a wide variety of grasses. For example the furanones of Examples I, III and V, respectively, exhibited complete preemergent herbicidal control of crab grass and foxtail at an application rate of 25 pounds per acre.

While this invention has been described with respect to certain embodiments it is not so limited and it is to be understood that variations and modifications thereof obvious to those skilled in the art can be made without departing from the spirit or scope of this invention.

What is claimed is:

1. A compound of the formula

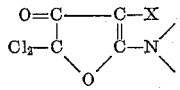

wherein X is a halogen of atomic number less than 36 and wherein —N< is a secondary amine residue selected from the group consisting of a (1) saturated single ring heterocyclic amine residue of the formula

wherein A is selected from the group consisting of —CH$_2$CH$_2$OCH$_2$CH$_2$—, —CH$_2$CH$_2$SCH$_2$CH$_2$—, and alkylene of from 4 to 10 carbon atoms and having from 4 to 6 carbon atoms in a continuous chain between the valence bonds, and a (2) secondary amine residue of the formula

wherein M and G are selected from the group consisting of hydrocarbyl having from 1 to 10 carbon atoms selected from the group consisting of alkyl, phenyl substituted alkyl, phenyl, alkyl substituted phenyl, and naphthyl, and said hydrocarbyl being substituted with substituents selected from the group consisting of one lower alkoxy, one to three chlorine atoms, and one to three bromine atoms.

2. A compound of the formula

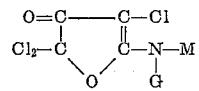

wherein M and G respectively are alkyl having 1 to 10 carbon atoms.

3. 5-dimethylamino-2,2,4-trichloro-3(2H)-furanone.
4. 5-diethylamino-2,2,4-trichloro-3(2H)-furanone.
5. 5-diphenylamino-2,2,4-trichloro-3(2H)-furanone.
6. 5 - (N - methyl - N - phenylamino) - 2,2,4 - trichloro-3(2H)-furanone.
7. The method of making a compound of the formula

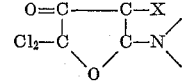

wherein X is halogen of atomic number less than 36 and wherein —N< is a secondary amine residue selected from the group consisting of a (1) sturated single ring heterocyclic amine residue of the formula

wherein A is selected from the group consisting of —CH$_2$CH$_2$OCH$_2$CH$_2$—, —CH$_2$CH$_2$SCH$_2$CH$_2$—, and alkylene of from 4 to 10 carbon atoms and having from 4 to 6 carbon atoms in a continuous chain between the valence bonds, and a (2) secondary amine residue of the formula

wherein M and G are selected from the group consisting of hydrocarbyl having from 1 to 10 carbon atoms selected from the group consisting of alkyl, phenyl substituted alkyl, phenyl, alkyl substituted phenyl, and naphthyl, and said hydrocarbyl being substituted with substituents selected from the group consisting of one lower alkoxy, one to three chlorine atoms, and one to three bromine atoms, which comprises reacting oxalyl chloride with an α-halo acetamide of the formula

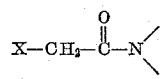

wherein X and —N< have the same significance as above.

8. The method of claim 7 attended by the step of hydrolyzing the 2,2-dichloro-3(2H)-furanone in the presence of a mineral acid.

9. The method of making chloropyruvic acid of the formula

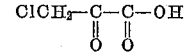

which comprises hydrolyzing a 2,2,4-trichloro-3(2H)-furanone of the formula

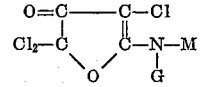

wherein M and G respectively are alkyl having 1 to 10 carbon atoms in the presence of a mineral acid.

No references cited.

NICHOLAS S. RIZZO, *Primary Examiner.*